(12) United States Patent
Southard et al.

(10) Patent No.: US 10,772,463 B2
(45) Date of Patent: Sep. 15, 2020

(54) GRAPHITE CONTAINING ARTICLE

(71) Applicant: NeoGraf Solutions, LLC, Lakewood, OH (US)

(72) Inventors: John Southard, Copley, OH (US); Ryan Wayne, Brecksville, OH (US); Thomas Weber, Akron, OH (US)

(73) Assignee: NeoGraf Solutions, LLC, Lakewood, OH (US)

( * ) Notice: Subject to any disclaimer, the term of this patent is extended or adjusted under 35 U.S.C. 154(b) by 171 days.

(21) Appl. No.: 16/082,667

(22) PCT Filed: Mar. 28, 2017

(86) PCT No.: PCT/US2017/024479
§ 371 (c)(1),
(2) Date: Sep. 6, 2018

(87) PCT Pub. No.: WO2017/172721
PCT Pub. Date: Oct. 5, 2017

(65) Prior Publication Data
US 2019/0021545 A1   Jan. 24, 2019

Related U.S. Application Data

(60) Provisional application No. 62/408,873, filed on Oct. 17, 2016, provisional application No. 62/356,818, (Continued)

(51) Int. Cl.
*A47J 36/04*   (2006.01)
*B32B 7/02*    (2019.01)
(Continued)

(52) U.S. Cl.
CPC ............... *A47J 36/04* (2013.01); *A47J 36/02* (2013.01); *B32B 3/04* (2013.01); *B32B 5/028* (2013.01);
(Continued)

(58) Field of Classification Search
CPC .......... A47J 36/04; A47J 36/025; A47J 36/02; A47J 27/002; B32B 7/027; B32B 7/02;
(Continued)

(56) References Cited

U.S. PATENT DOCUMENTS 3,404,061 A * 10/1968 Bochman ............... C04B 20/06
                                                 428/143
4,354,082 A * 10/1982 Tellert ..................... H05B 6/12
                                                 219/621
(Continued)

FOREIGN PATENT DOCUMENTS

| EP | 0567822 A1 * | 11/1993 | ............... A47J 36/02 |
| EP | 0755645 A1 * | 1/1997 | ............ A47J 27/002 |
| KR | 20090006658 U | 7/2009 | |

OTHER PUBLICATIONS

Translation of EP755645, Wich, Jul. 23, 1996, p. 2. (Year: 1996).*
(Continued)

*Primary Examiner* — Robert J Hicks
(74) *Attorney, Agent, or Firm* — Calfee, Halter & Griswold LLP

(57) ABSTRACT

Cookware and other heating articles are included herein. The article may have a substrate forming a bottom surface of the cookware. The article may also have a graphite intermediate layer and cooking/heating surface disposed above the intermediate layers. The graphite layer may have one or more of the following properties: (1) a density of at least 0.64 g/cm³; (2) a water pick-up of a less than 30% by weight after a 2.5 hour soak in water at ambient conditions; (3) a Taber stiffness in the machine direction at least 25% higher than in the transverse direction; and (4) a sulfur content of less than 350 ppm and any combination thereof.

20 Claims, 6 Drawing Sheets

Related U.S. Application Data filed on Jun. 30, 2016, provisional application No. 62/316,565, filed on Mar. 31, 2016.

(51) Int. Cl.

| | |
|---|---|
| B32B 27/14 | (2006.01) |
| B32B 9/04 | (2006.01) |
| B32B 15/16 | (2006.01) |
| B32B 15/20 | (2006.01) |
| B32B 5/18 | (2006.01) |
| B32B 5/30 | (2006.01) |
| B32B 3/04 | (2006.01) |
| B32B 15/04 | (2006.01) |
| B32B 5/32 | (2006.01) |
| B32B 9/00 | (2006.01) |
| B32B 15/18 | (2006.01) |
| B32B 5/02 | (2006.01) |
| B32B 21/10 | (2006.01) |
| B32B 7/027 | (2019.01) |
| B32B 5/22 | (2006.01) |
| B32B 15/08 | (2006.01) |
| B32B 5/14 | (2006.01) |
| B32B 27/12 | (2006.01) |
| B32B 17/06 | (2006.01) |
| B32B 21/04 | (2006.01) |
| B32B 27/06 | (2006.01) |
| A47J 36/02 | (2006.01) |
| B32B 15/02 | (2006.01) |
| B32B 27/08 | (2006.01) |
| B32B 15/14 | (2006.01) |
| B32B 27/32 | (2006.01) |
| B32B 5/24 | (2006.01) |

(52) U.S. Cl.
CPC ............... *B32B 5/14* (2013.01); *B32B 5/18* (2013.01); *B32B 5/22* (2013.01); *B32B 5/245* (2013.01); *B32B 5/30* (2013.01); *B32B 5/32* (2013.01); *B32B 7/02* (2013.01); *B32B 7/027* (2019.01); *B32B 9/005* (2013.01); *B32B 9/007* (2013.01); *B32B 9/04* (2013.01); *B32B 9/041* (2013.01); *B32B 9/042* (2013.01); *B32B 9/045* (2013.01); *B32B 9/046* (2013.01); *B32B 9/047* (2013.01); *B32B 9/048* (2013.01); *B32B 15/02* (2013.01); *B32B 15/046* (2013.01); *B32B 15/08* (2013.01); *B32B 15/14* (2013.01); *B32B 15/16* (2013.01); *B32B 15/18* (2013.01); *B32B 15/20* (2013.01); *B32B 17/06* (2013.01); *B32B 21/047* (2013.01); *B32B 21/10* (2013.01); *B32B 27/065* (2013.01); *B32B 27/08* (2013.01); *B32B 27/12* (2013.01); *B32B 27/14* (2013.01); *B32B 27/32* (2013.01); *B32B 2250/03* (2013.01); *B32B 2250/04* (2013.01); *B32B 2250/40* (2013.01); *B32B 2260/025* (2013.01); *B32B 2260/046* (2013.01); *B32B 2262/02* (2013.01); *B32B 2262/0253* (2013.01); *B32B 2262/0284* (2013.01); *B32B 2262/067* (2013.01); *B32B 2262/101* (2013.01); *B32B 2262/106* (2013.01); *B32B 2264/108* (2013.01); *B32B 2266/02* (2013.01); *B32B 2266/126* (2016.11); *B32B 2307/202* (2013.01); *B32B 2307/208* (2013.01); *B32B 2307/30* (2013.01); *B32B 2307/302* (2013.01); *B32B 2307/304* (2013.01); *B32B 2307/308* (2013.01); *B32B 2307/50* (2013.01); *B32B 2307/72* (2013.01); *B32B 2307/724* (2013.01); *B32B 2307/732* (2013.01); *B32B 2439/00* (2013.01); *B32B 2439/40* (2013.01); *B32B 2509/00* (2013.01)

(58) Field of Classification Search
CPC .. B32B 3/04; B32B 5/028; B32B 5/14; B32B 5/22; B32B 5/30; B32B 9/007
USPC ............ 220/573.3, 573.2, 573.1, 912, 62.17, 220/62.11; 29/447; 428/597, 596, 66.6, 428/131, 137, 34.1; 99/422, 401, 447
See application file for complete search history.

(56) References Cited

U.S. PATENT DOCUMENTS

| | | | | |
|---|---|---|---|---|
| 4,395,299 | A * | 7/1983 | Riggs | ................... C09J 5/06 156/285 |
| 4,541,411 | A * | 9/1985 | Woolf | ................. A47J 36/02 126/390.1 |
| 6,657,170 | B2 | 12/2003 | Clothier | |
| 6,858,297 | B1 * | 2/2005 | Shah | ............... B01D 39/1623 156/167 |
| 9,078,539 | B2 * | 7/2015 | Groll | .................. B23K 20/023 |
| 2002/0141933 | A1 * | 10/2002 | Kubo | ................... B32B 37/156 423/448 |
| 2009/0152276 | A1 | 6/2009 | Groll | |
| 2011/0041708 | A1 | 2/2011 | Groll | |
| 2011/0073602 | A1 | 3/2011 | Musil | |
| 2014/0316551 | A1 * | 10/2014 | Ellis | ...................... G01N 27/90 700/127 |
| 2015/0047513 | A1 * | 2/2015 | Okano | ................... A47J 36/02 99/358 |
| 2015/0258712 | A1 * | 9/2015 | Moser | .................... B32B 5/022 428/113 |
| 2016/0057830 | A1 | 2/2016 | Klett | |
| 2017/0157895 | A1 * | 6/2017 | Groll | ...................... B32B 15/18 |

OTHER PUBLICATIONS

Translation of EP567822, Heinzel et al., Apr. 8, 1993, Figs. 1 and 2 (Year: 1993).*
Extended European Examination Search Report European Application No. 17776432.1 dated Aug. 19, 2019.
International Search Report from corresponding International Application No. PCT/US2017/024479, dated Jun. 20, 2017.

* cited by examiner

Table II(a)

| GRAPHITE TYPE | SYNTHETIC GRAPHITE (40 MICRON LAYERS) | | | | | | | | | | | | | | |
|---|---|---|---|---|---|---|---|---|---|---|---|---|---|---|---|
| AVRAGE GRAPHITE SURFACE TEMP. (°C) | 56.1 | 99.6 | 156.8 | 186.6 | 193.8 | 144.4 | 163.8 | 130.4 | 174.4 | | 125.5 | 154.9 | 166.1 | 184.8 | |
| AVERGE TEMP. ADJACENT HOB (°C) | 26.9 | 27.9 | 29.2 | 32.3 | 31.6 | 28.7 | 31.9 | 30.5 | 32.3 | | 31.3 | 28.1 | 28.8 | 30.8 | |
| AVGERAGE CENTER SURFACE TEMP. (°C) | 61.1 | 131.4 | 181.3 | 227.1 | 196.1 | 161.4 | 207.0 | 192.9 | 204.2 | | 169.0 | 221.3 | 234.4 | 250.3 | |
| AVERAGE WATER TEMP (C) | 44.5 | 68.2 | 73.1 | 75.4 | 69.6 | 72.2 | 75.0 | 77.0 | 77.3 | | 69.9 | 77.6 | 80.9 | 81.3 | |
| MAX. GRAPHITE SURFACE TEMP. (°C) | 67.9 | 139.8 | 192.9 | 222.9 | 241.3 | 174.1 | 199.7 | 166.9 | 204.7 | | 159.6 | 191.2 | 197.5 | 222.6 | |
| FINAL WATER TEMP (°C) | 62.2 | 100.0 | 100.2 | 100.3 | 100.3 | 100.5 | 100.5 | 100.4 | 100.4 | | 100.5 | 100.9 | 101.1 | 101.3 | |
| TIME TO BOIL (min.) | | 8.7 | 7.4 | 6.7 | 7.7 | 7.8 | 6.5 | 6.5 | 6.2 | | 7.8 | 5.7 | 5.0 | 4.2 | |
| DURATION (min.) | 25 | 10 | 10 | 10 | 10 | 10 | 10 | 10 | 10 | | 10 | 10 | 10 | 10 | 10 |
| BOILS | n | y | y | y | y | y | y | y | n | | y | y | y | y | n |
| INSULATION LAYERS | 1 | 1 | 1 | 1 | 1 | 2 | 2 | 2 | 2 | 2 | 3 | 3 | 3 | 3 | 3 |
| EFFECTIVE GRPAHITE LAYER PLANES | 92674 | 186222 | 289105 | 368073 | 459436 | 186222 | 289105 | 368073 | 459436 | 553421 | 186222 | 289105 | 368073 | 459436 | 553421 |
| FOIL DENSITY (g/cm3) | 1.85 | 1.84 | 1.82 | 1.80 | 1.79 | 1.84 | 1.82 | 1.80 | 1.79 | 1.82 | 1.84 | 1.82 | 1.80 | 1.79 | 1.82 |
| FOIL THICKNESS (Å) | 3.78E+05 | 7.63E+05 | 1.20E+06 | 1.54E+06 | 1.93E+06 | 7.63E+05 | 1.20E+06 | 1.54E+06 | 1.93E+06 | 2.30E+06 | 7.63E+05 | 1.20E+06 | 1.54E+06 | 1.93E+06 | 2.30E+06 |
| FOIL THICKNESS (mm) | 0.04 | 0.08 | 0.12 | 0.15 | 0.19 | 0.08 | 0.12 | 0.15 | 0.19 | 0.23 | 0.08 | 0.12 | 0.15 | 0.19 | 0.23 |
| FOIL LAYERS | 1 | 2 | 3 | 4 | 5 | 2 | 3 | 4 | 5 | 6 | 2 | 3 | 4 | 5 | 6 |

FIG. 7a

Table II(b)

| GRAPHITE TYPE | COMPRESSED EXPANDED NATURAL GRPAHITE (SULFUR CONTENT < 350 ppm) | | | | | | | | | | | | |
|---|---|---|---|---|---|---|---|---|---|---|---|---|---|
| AVERAGE GRAPHITE SURFACE TEMP. (°C) | 48.9 | 194.2 | 210.7 | 212.4 | 211.1 | 158.8 | 149.9 | 195.3 | 175.8 | 173.0 | 191.0 | 203.5 | 200.2 |
| AVGERAGE TEMP. ADJACENT HOB (°C) | 25.1 | 31.2 | 31.6 | 28.4 | 30.4 | 27.3 | 29.2 | 28.9 | 29.0 | 30.2 | 28.3 | 30.5 | 30.9 |
| AVERAGE CENTER SURFACE TEMP. (°C) | 57.7 | 189.7 | 231.3 | 209.9 | 238.0 | 189.4 | 203.8 | 238.2 | 227.9 | 202.5 | 234.8 | 236.9 | 216.6 |
| AVERAGE WATER TEMP (C) | 34.9 | 71.6 | 70.0 | 74.1 | 69.7 | 63.2 | 66.7 | 74.8 | 63.5 | 71.4 | 79.7 | 79.3 | 75.1 |
| MAX. GRAPHITE SURFACE TEMP. (°C) | 60.3 | 220.8 | 256.7 | 277.6 | 265.9 | 200.1 | 192.2 | 238.2 | 217.2 | 205.5 | 231.1 | 247.1 | 247.6 |
| FINAL WATER TEMP (°C) | 47.2 | 101.2 | 100.2 | 101.5 | 100.1 | 100.4 | 101.0 | 100.9 | 100.1 | 100.4 | 100.7 | 100.5 | 100.4 |
| TIME TO BOIL (min.) | | 8.0 | 7.8 | 7.7 | 8.7 | 9.5 | 8.7 | 7.2 | 9.3 | 7.5 | 5.2 | 5.5 | 6.7 |
| DURATION (min.) | 25 | 10 | 10 | 10 | 10 | 10 | 10 | 10 | 10 | 10 | 10 | 10 | 10 |
| BOILS | n | y | y | y | y | y | y | y | y | y | y | y | y |
| INSULATION LAYERS | 1 | 1 | 1 | 1 | 1 | 2 | 2 | 2 | 2 | 3 | 3 | 3 | 3 |
| EFFECTIVE GRPAHITE LAYER PLANES | 423809 | 848492 | 1274705 | 1695069 | 2124727 | 848492 | 1274705 | 1695069 | 2124727 | 848492 | 1274705 | 1695069 | 2124727 |
| FOIL DENSITY (g/cm3) | 1.22 | 1.23 | 1.23 | 1.23 | 1.23 | 1.23 | 1.23 | 1.23 | 1.23 | 1.23 | 1.23 | 1.23 | 1.23 |
| FOIL THICKNESS (Å) | 2.63E+06 | 5.22E+06 | 7.80E+06 | 1.04E+07 | 1.30E+07 | 5.22E+06 | 7.80E+06 | 1.04E+07 | 1.30E+07 | 5.22E+06 | 7.80E+06 | 1.04E+07 | 1.30E+07 |
| FOIL THICKNESS (mm) | 0.26 | 0.52 | 0.78 | 1.04 | 1.30 | 0.52 | 0.78 | 1.04 | 1.30 | 0.52 | 0.78 | 1.04 | 1.30 |
| FOIL LAYERS | 1 | 2 | 3 | 4 | 5 | 2 | 3 | 4 | 5 | 2 | 3 | 4 | 5 |

FIG. 7b

GRAPHITE CONTAINING ARTICLE

TECHNICAL FIELD

The present disclosure relates to a field of articles used for cooking or heating applications, and particular examples such as cookware articles or laboratory ware, which include an intermediate layer of graphite.

BACKGROUND

Prior art types of cookware include the following: (1) high ferritic stainless steel compositions designed for induction cooking; (2) regular stainless steel compositions designed for conductive heating; (3) metals coated or cladded with high ferritic stainless steel for induction cooking; and (4) glass or ceramic cookware.

BRIEF DESCRIPTION

Embodiments disclosed herein include cookware as well as other articles that may be used for heating an object. In one embodiment, the article may have a substrate comprising a bottom surface of the cookware. The cookware may also have a graphite intermediate layer and a cooking surface disposed above the intermediate layer. Preferably the graphite layer may have one or more of the following properties: (1) a density of at least 0.64 g/cm$^3$; (2) a water pick-up of a less than 30% by weight after a 2.5 hour soak in water at ambient conditions; (3) a Taber stiffness in the "machine direction" at least 25% higher than in the "transverse direction"; and (4) a sulfur content of less than 400 ppm. Optionally the graphite may have any combination of such properties.

It is to be understood that both the foregoing general description and the following detailed description provide embodiments of the invention and are intended to provide an overview or structure of understanding of the nature and character of the invention as it is claimed. The accompanying drawings are included to provide a further understanding of the invention, are incorporated in, and constitute a part of the specification. The drawings illustrate various embodiments of the invention and together with the description serve to describe the principles and operations of the invention.

BRIEF DESCRIPTION OF THE DRAWINGS

FIGS. 7*a*, 7*b* are tables (TABLE IIa, TABLE IIb) illustrating time to boil conditions for embodiments of the graphite article disclosed herein.

DETAILED DESCRIPTIONS

Figure 1A:
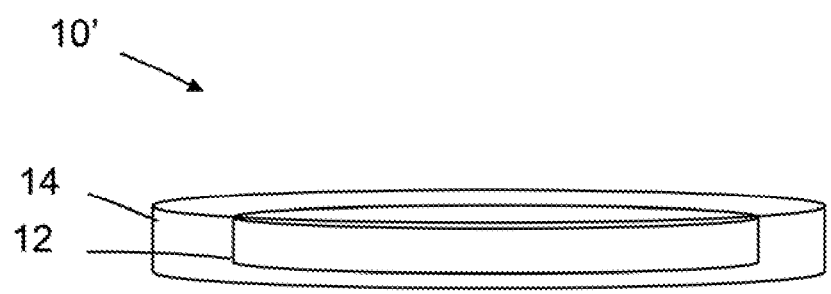
FIG. 1*a* illustrates an embodiment of the graphite article disclosed herein that could be used for heating.

One embodiment disclosed herein includes a cookware article. The cookware article may have a substrate comprising a bottom surface of the cookware. The cookware further includes an intermediate layer comprising a layer of graphite; and a cooking surface disposed above the intermediate layer. The graphite layer may comprise at least one of a sheet of compressed particles of exfoliated graphite, graphitized polymer or combinations thereof. Optionally, the intermediate layer may include a plurality of the graphite sheets in any combination thereof.

The graphite layer may have one or more of the following properties: (1) a density of at least 0.64 g/cm$^3$, up to about 2.25 g/cm$^3$ (including any density in between); (2) a water pick-up of a less than 30% by weight after a 2.5-hour soak in water at ambient conditions. Preferably less than 28% by weight; (3) a Taber stiffness in the machine direction at least 25% higher than in the transverse direction, preferably at least 30% higher; and (4) a sulfur content of less than 375 ppm, preferably less than 250 ppm and more preferably less than 200 ppm. A Leco S-144DR may be used to determine the sulfur content of the sample. The Leco S-144DR is a system for analyzing total sulfur content of a given sample. Its lower end detection limits is approximately 50 ppm. Equipment to measure the Taber stiffness is available from Taber Industries of North Tonawanda, N.Y. The water pick-up may be determined by measuring the change in weight of the graphite layer before and after immersion in water under the specified conditions.

In a particular embodiment, the graphite article comprises a sufficient amount of magnetically susceptible material such that it successfully couples to an applied magnetic field generated with adequate power as delivered by a frequency of at least 15 KHz in such a way that it generates heat. In one embodiment up to about 50 KHz, possibly even up to 70 KHz. One example of sufficient amount of graphite is a graphite layer having a thickness of at least 7 microns. In at least one exemplary embodiment, an upper limit on the thickness may be about 5 mm. An example of a top end of frequency used for cooking is no more than 100 KHz.

In further embodiments, the graphite layer of the intermediate layer has a surface area, which comprises at least seven (7-in$^2$) square inches. Typically, the graphite layer will not have a surface area of more than one (1 m$^2$) square meter. Examples of particular foot print sizes for the graphite layer typically range from 78 to 452 square inches (in$^2$) for five (5") to twelve (12") inch diameter pans respectively. Some specific examples include graphite layers having a footprint in the range of the 300 to 390 square inches (in$^2$).

In another embodiment, the graphite layer may be in the form of a single article compressed together from graphite disks having a diameter of anywhere from three inches to twelve inches (3"-12") in diameter. The article may be formed from two to ten (2-10) layers of compressed particles of exfoliated graphite. An exemplary thickness for each layer of graphite may be 5 mil with an example density of 0.85 g/cm$^3$.

In one particular embodiment, the graphite intermediate layer may function as a diamagnetic material, which exhibits magnetic susceptibility generating an induced field opposite of the imposed applied magnetic field.

In other particular embodiment, the graphite intermediate layer may be placed in contact with other thin layers such as metal films of copper, aluminum, silver, iron (aka steel) and alloys thereof to alter the interaction of the applied magnetic field and thereby provide a means to tailor the particular thermal response. The thickness of any particular metal film may be from about 5 microns up to about 0.5 mm (500 microns).

In other particular embodiments, graphite intermediate layer may include one or more wire meshes embedded within it. Suitable materials for the wire mesh may include aluminum, brass, columbium, copper, gold, Inconel, nickel, nickel alloys, phosphor, bronze, platinum, silver, stainless steel, low carbon steel, tantalum, titanium, zinc, zirconium, Polyether ether ketone (PEEK), PTFE, PFA, ECTFE, polypropylene, polyethylene, PET (such as but not limited to Mylar® a registered trademark of DuPont) and combinations thereof. Including the mesh within the graphite intermediate layer enables the graphite to be easily formed into a 3-D shape for incorporation into another article.

Graphite has significantly different thermal properties, densitometric, and magnetic characteristics than ferromagnetic materials commonly used in manufacturing cookware. Graphite enabled cookware may have one or more of the advantages of (1) light-weight, (2) thermally responsive and (3) thermally uniform cooking. These advantageous can function well in all surface cooking technologies (e.g. gas, conventional electric, infrared, and induction cooktops.) See Table 1 of property differences below:

constructed from it generates less than a 2° C. thermal increase per minute given initial conditions of standard temperature and pressure.

In another embodiment, the substrate may have a through plane thermal conductivity of less than about 75 W/mK. Non-limiting examples of such materials include low ferritic stainless steel, glass (e.g., borosilicate glass), ceramic, plastic, cork, wood or other materials which by their magnetic properties would not generate the above threshold amount of energy as described by the individual thermal stability limits (i.e. melting points or decomposition temperatures) when exposed to the above noted magnetic field. These embodiments may be practiced together or separately. If a material with a higher thermal conductivity were desired, options may include aluminum, copper, silver, and/or other metals and alloys thereof.

Examples of cookware, for which the above embodiments are suitable, include a baking pan, a saucepan, a frying pan, a rice cooker, a grill, a popcorn popper, a coffee pot, a teakettle, a coffee mug, a sauté pan, and a soup bowl. The cookware may be used for convection, conduction, infrared or induction heating. The concepts disclosed herein are also applicable to a cooking surface such as a range top stove or a cook-top for an oven. In such embodiments, the graphite

TABLE 1

| material | In-plane thermal conductivity (W/mK) | density (g/cm$^3$) | CTE linear ($10^{-6} \cdot$ K$^{-1}$) | specific heat capacity (J/Kg · K) | molar heat capacity (J/mol · K) | Vol. specific heat capacity | practical magnetic susceptibility |
|---|---|---|---|---|---|---|---|
| graphite | 300-2000 | 0.64-2.27 | 0.5 | 0.71 | 0.0085 | 0.0192 | yes |
| copper | 385 | 8.96 | 17 | 0.39 | 0.0244 | 7.9022 | special circumstances |
| aluminum | 205 | 2.70 | 23.1 | 0.90 | 0.0243 | 2.3651 | no |
| stainless steel (1810) | 16-21 | 7.99 | 17.3 | 0.50 | 0.0277 | 7.9900 | no |
| steel (high ferritic steel) | 50 | 7.87 | 11.8 | 0.44 | 0.0246 | 6.9768 | yes |
| glass | 0.8 | 2.4-2.8 | 0.33 | 0.84 | 0.0505 | 4.5515 | no |

Other properties of interest relative to graphite's thermal performance with respect to embodiments described herein include the molar heat capacity, and the volume specific heat capacity. Such properties may be good indicators of how quickly a particular material may achieve and release its heat, thus revealing the thermal responsiveness advantages of graphite.

Alternative types of graphite may include at least one of isomolded graphite, extruded graphite, graphite foam, molded graphite or combinations thereof.

Optionally, the cookware article may further comprise an insulation material disposed between the substrate and the intermediate layer. Insulating materials which, may optionally be incorporated into the cookware include aerogels, glass-wool, fiber glass, carbon fiber, carbon foams, high temperature plastic or ceramic insulation, and/or graphene.

The substrate may comprise an insufficient amount of ferromagnetic material to cook by induction. Alternatively, the substrate may comprise a non-magnetic material. For the purpose of this disclosure, a nonmagnetic material is one that does not respond to an applied magnetic field in such a way that it generates an appreciable thermal response sufficient for cooking/heating. A material may be considered non-magnetic for cooking or heating purposes if an article layer will be an intermediate layer between a bottom layer and a top surface. The top surface may function as a heat-delivering layer to an article to be heated instead of the actual surface in contact with the food or liquid to be cooked.

In a particular embodiment of the cookware, the substrate comprises a structural architecture to support the graphite intermediate layer. The structural architecture comprises an insufficient amount of a magnetically susceptible material to create a thermal response suitable for cooking when exposed to a magnetic field, whereby the magnetic field passes through the structural architecture. The graphite in the intermediate layer has an effective amount of magnetic susceptibility when exposed to the magnetic field. The magnetic susceptibility thereby generates heat that is conducted to the cooking surface of the cookware, thus transferring heat from the cookware to the food or other matter being, cooked or heated.

The optional insulative material in the cookware may be used in various ways, for example, regarding cookware having sidewalls, the insulative material may be disposed uniformly throughout the sidewalls of the cookware. Another optional embodiment, the insulative material may be disposed uniformly under the intermediate layer or non-uniformly under the intermediate layer. In further optional embodiment, the insulative material may extend along the thickness of the intermediate layer.

An embodiment of cookware disclosed herein includes the afore described graphite encased within aluminum, and/or low ferritic stainless steel or other metals or alloys that do not by virtue of their magnetic properties generate the above threshold amount of heat when exposed to the afore noted magnetic fields. This embodiment has particular application to at least the following types of cookware: a boiling assist plate, cookware adapter, a diffuser plate, heat retaining soup bowls, food, serving ware, rice cooker, popcorn popper, induction grill heating elements, induction range heating elements, induction coffee pots, induction tea kettles, induction enabled coffee mugs and induction enabled food storage containers; as well as the afore mentioned types of cookware.

Another embodiment of cookware disclosed herein includes the afore mentioned graphite(s) encased within borosilicate glass, aluminosilicate glass, oxide glass, glass ceramic, or otherwise high temperature glass or ceramic materials to enable the generation of heat via exposure to the above magnetic field. This embodiment is also applicable to above types of cookware as described in the paragraph above. A further embodiment applicable to at least the above types of cookware include the afore noted graphite encased within high or low-density polyethylene (HDPE or LDPE), otherwise high temperature plastics, or high-temperature plastic composites (e.g. graphite fiber composites) to enable the generation of heat via exposure to a magnetic field.

The graphite disclosed herein may have the unique combination of advantageous material properties: (1) coupling to a magnetic field, (2) heat spreading, (3) desirable heat capacity (i.e. able to rapidly achieve and release heat), and (4) low density relative to other potential materials (promoting light-weight articles).

The concepts disclosed herein are further illustrated and explained in accordance with the illustrations. Referring now to FIG. 1a, an embodiment of the graphite article disclosed herein that could be used for heating is illustrated generally at 10'. Graphite article 10' may include an internal graphite section 12. Section 12 may be any desired shape. Preferably, section 12 has a thickness of at least 7 microns. Section 12 may be constructed from any of the above-described graphite types or combinations thereof. A trim piece 14 may surround section 12. The trim piece 14 may be constructed preferably by any material, which would not sufficiently couple with a magnetic field. Further piece 14 may be constructed from any insulative material, including but not limited to glass, plastic, or ceramic.

Figure 1B:
FIG. 1*b* illustrates another embodiment of the graphite article having wire mesh as disclosed herein.

Referring now to FIG. 1b, another embodiment of a graphite article is shown generally at 10". The graphite article 10" includes an internal graphite section 12, as described above, having a having a wire mesh 13 embedded within it. The wire mesh 13 is formed of a material as described above. It should be appreciated that more than one wire mesh 13 can be included, formed of that same material or formed of different materials. Including the mesh 13 within the graphite section 12 enables the graphite section to be easily formed into a 3-D shape for incorporation into another article. A trim piece 14 can surround section 12, as described above.

The graphite articles 10' and 10" can be referred to generally as graphite article 10.

Figure 2:
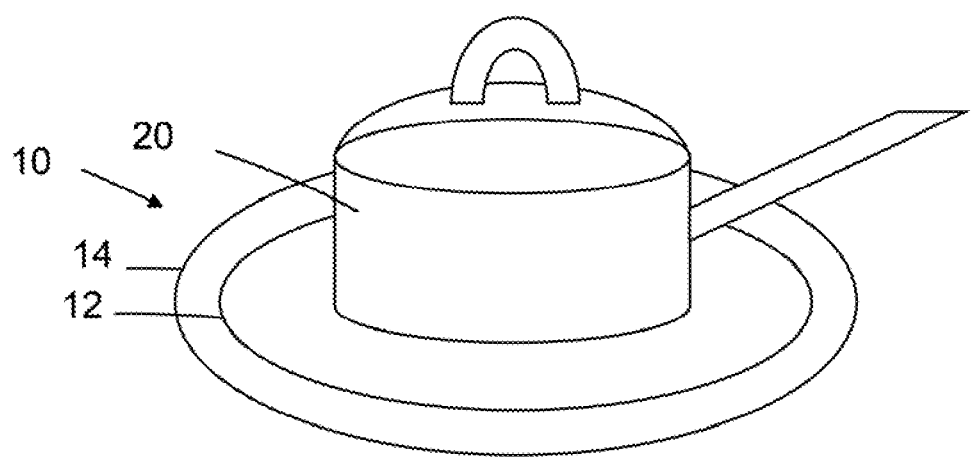
FIG. 2 is a perspective view the embodiment shown in FIG. 1*a* in combination with standard cookware used to heat the contents of the standard cookware.
Figure 3:
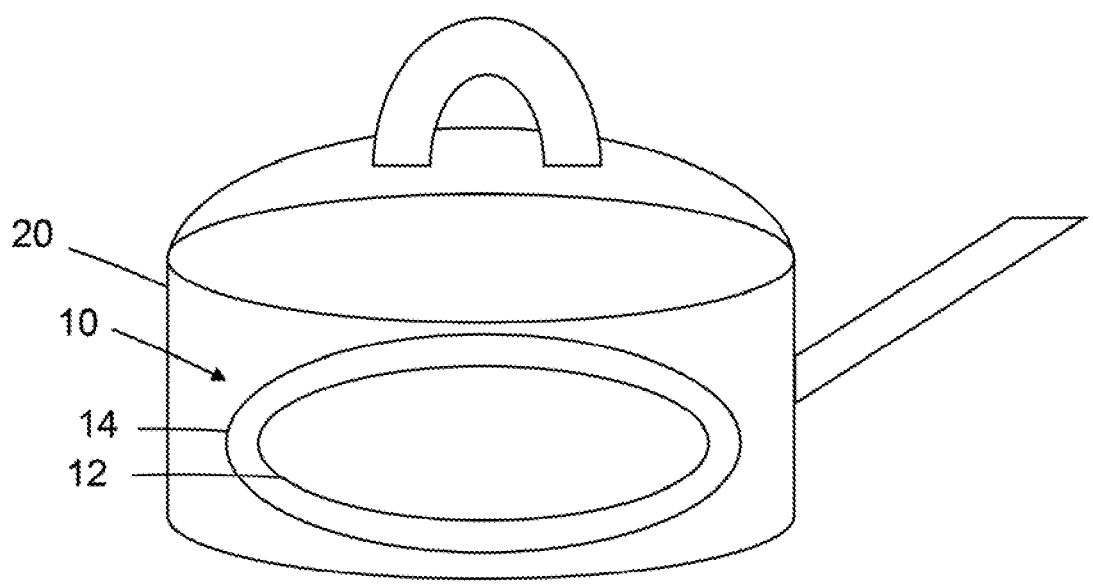
FIG. 3 is an interior view showing the embodiment shown in FIG. 1*a* inside the cookware.

As shown in FIG. 2, a pan 20 may be located on top of graphite article 10 for heating material inside the pan. The graphite article 10 may be located on an induction-heating surface or a resistively heated surface (not shown) to apply heat to the pan 20. Graphite article 10 may be located below pan 20, as shown in FIG. 2, to heat items inside pan 20 or article 10 may be located inside pan 20 to heat the contents of pan 20, as shown in FIG. 3.

Figure 4:
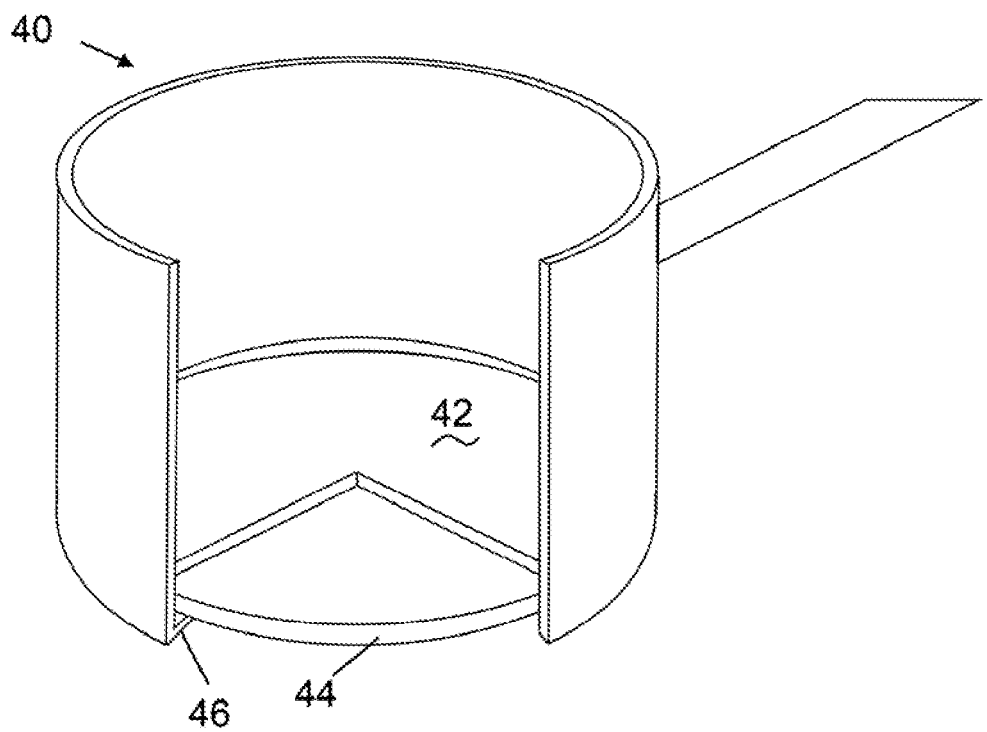
FIG. 4 is a partial sectional view of another embodiment described herein.
Figure 5:
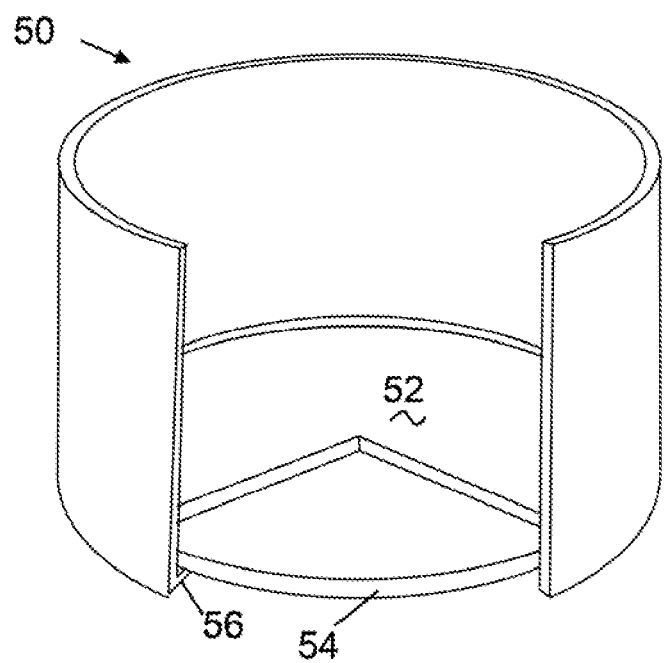
FIG. 5 is a partial sectional view of a further embodiment disclosed herein.

FIG. 4 is a partial sectional view of another embodiment described herein. Illustrated in FIG. 4 is a saucepan 40, which includes a cooking surface 42 and graphite intermediate layer 44 and the substrate 46. As shown, cooking surface 42 and substrate 46 may be constructed from metal, glass, ceramic or other material of choice; however, any of the above-described embodiments may be applied to pan 40. Equally, the above description regarding the intermediate layer also applies to intermediate layer 44. As shown in FIG. 5, this concept may also be applied to a pot 50, likewise including the cooking surface 52, intermediate layer 54 and substrate 56.

Figure 6:
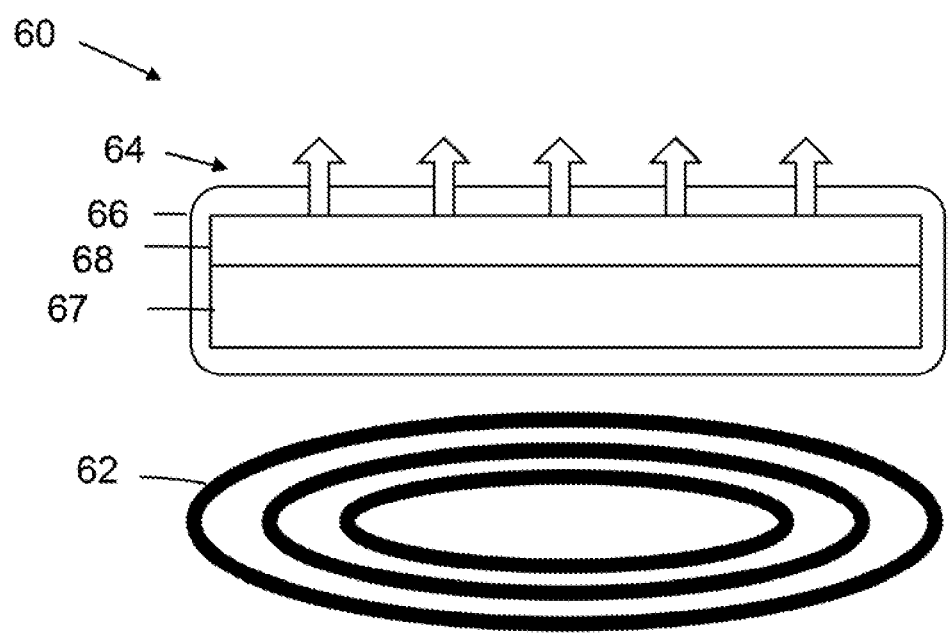
FIG. 6 is a schematic view of an embodiment disclosed herein illustrating induction heating that could be used for cooking.

FIG. 6 is a schematic view of an embodiment disclosed herein illustrating induction heating assembly shown generally 60 that can be used for cooking. The induction heating assembly 60 includes an induction hob 62. The application of electricity to induction hob 62 generates a magnetic field typically having a frequency of greater than 15 KHz.

Further, in FIG. 6, heating element 64 may include an outer casing 66. Casing 66 may encapsulate the other components of element 64. Element 64 may include an insulative material 67 proximate the induction hob 62. Element 64 may further include a graphite layer 68 adjacent the insulative material 67 on the side opposed to the induction hob 62. Preferably, graphite layer 68 comprises sufficient thickness to allow its magnetic susceptibility to couple effectively such that it generates heat when exposed to the magnetic field generated by hob 62.

Referring now to FIGS. 7a, 7b, TABLES IIa and IIb are provided illustrating time to boil information for various embodiments of the graphite article as described herein. Compressed expanded natural graphite having a sulfur content of less than 350 ppm, in embodiments having from between 1 and 5 layers were analyzed. Also, synthetic graphite having between 1 and 6 layers were analyzed. Tables IIa and IIb illustrate the 90 time to boil for the effective number of graphene layers of these embodiments.

The cookware embodiments disclosed herein may also have applications to laboratory ware ("lab ware") or industrial processing equipment were in rapid heating of a liquid, gas or solid would be desirable. Examples of suitable liquids may range from water to synthetic or organic polymers. An example of an article that may have applications outside of cookware will include the afore mentioned substrate, afore mentioned graphite layer and an upper surface disposed above the graphite layer. Non-limiting examples of articles this is applicable to include beakers, flasks, etc. The same as the cookware embodiments, in these embodiments, the graphite layer would be an intermediate layer in thermal communication with the working surface of the lab ware in contact with the work piece (solid and/or liquid). Optionally an insulation layer may be included adjacent the graphite layer, opposed to the working surface of the lab ware.

A specific embodiment of interest may include an article having a graphite intermediate layer sandwiched between glass and/or ceramic layers. Optionally, this embodiment may include an insulation layer. Preferably, the insulation layer is located adjacent to the graphite layer in a location to promote heat transfer to the work piece being heated or cooked. Examples of such location may include the surface of the graphite layer closest to the induction hob and/or along the peripheral edges of the graphite layer. In one embodiment, the insulation may function to isolate and direct the thermal transfer of the heat in a single direction, thereby optimizing thermal transfer efficiency in the direction of desired thermal effect and shielding thermal transfer in one or more non-desired directions.

For an industrial application example, graphite may form the platens for a hot press. Such that the graphite platens may be applied to the work piece to be pressed. The graphite is in thermal communication with the work piece. Additionally an induction hob is in communication with the platens and is used to generate the magnetic field, thereby generating the heat to hot press the work piece. Suitable types of graphite for the platens include laminates of flexible graphite (resin impregnated, non-resin impregnated and any combination thereof), isomolded graphite, molded graphite, or extruded graphite or some other suitable grades of structural graphite, which can be used as an inductively susceptible source material. This process may be used to fabricate planar as well as non-planar articles. If so desired, each platen may have its own induction hob.

Another embodiment envisioned herein includes a sheet of graphite, either compressed particle of exfoliated graphite, graphitized polymer or combinations thereof, disposed between an upper surface and a lower substrate. Insulation may be located between the sheet of graphite and the lower substrate. This assembly of an upper substrate, sheet of graphite, insulation layer and a lower substrate may be incorporate into to any type of article, which may be desired to be inductively heated. Preferably, the lower substrate is disposed closer to the induction coil and the upper substrate of the assembly is closest to the workpiece to be heated. As for an alternative embodiment, if so desired, the graphite sheet may be replaced with another material, which is susceptible to coupling with a magnetic field to generate heat. Furthermore, the lower substrate is not limited to any particular material, except that it is not a material that is susceptible to coupling with a magnetic field to generate heat. In this embodiment, the graphite sheet may range from standard material to the above noted types of graphite.

In terms of some preferred embodiments for using a mass of compressed particles of exfoliated graphite ("CPEG") to induce the magnetic field, examples of independent exemplary properties may include the mass of graphite having a thickness of at least 300 μm. Suitable of the thickness of the mass of CPEG has been confirmed up to about 1.5 mm (1500 μm). All thicknesses in between 300 μm and 1500 μm are contemplated as disclosed herein. Preferably the mass of CPEG has a density of more than 1.22 g/cc. In terms of graphene layers planes to induce the magnetic field, an exemplary number of layer planes in the mass of CPEG is at least 425,000. An example of an upper beyond number of layer planes Of graphene is up to about 3,000,000. Though all number of graphite layer planes between 425,000 and 3,000,000 are contemplated herein, one preferred range of layers of planes of graphene is 100,000 to 180,000.

In terms of graphitized polymer embodiments, a preferred thickness is at least 45 μm. An upper end of the thickness of the mass of graphitized polymer is no more than 300 μm; all thickness in between 45 and 300 μm are contemplated herein. A preferred number of layer planes of graphene in the mass of graphitized polymer include at least 100,000. An example of a non-limiting upper end may be less than 600,000. A preferred range of layer planes of graphene for the mass of graphitized polymer may include 250,000 to 600,000. Another independent property for the mass of graphitized polymer may include the electrical conductivity. In an embodiment, a preferred in-plane electrical conductivity is at least 16000 S/cm. A non-limiting exemplary upper end for in-plane electrical conductivity may be up to 20000 S/cm.

A further embodiment contemplated herein includes forming a composite matrix whereby graphite powders can be incorporated in various forms of ceramic precursor and/or glass precursor materials for the purpose of making the precursor suitable to sufficiently inductively couple to a magnetic field to generate an adequate amount of heat so that the composite may be used for inductive heating applications. A benefit of this embodiment is that the composite matrix may be further transformed into any desired geometries. Likewise, the composite matrix may be incorporated into any desired article.

Each embodiment disclosed herein may offer at least one of the followings advantages: (1) increased in-plane thermal conductivity; (2) uniform heat transfer; (3) elimination of hot spots; (4) reduced dimensional change over time; (5) reduced warping of the cookware; (6) reduced staining (caused by exposure to moisture and oxygen associated with repeated use of certain types of cookware) of the cookware; (7) reduced discoloration (associated with the reaction of the surface of certain types of cookware with acid rich foods) of the cookware; (8) reduction in vibration and elimination of noise generated thereby during induction cooking; (9) coatings on the cookware exhibit longer life; (10) reduction in cost; (11) reduction in weight; (12) elimination of the necessary use of high ferritic based stainless steel for induction cooking; (13) a simplified architecture; and (14) cookware with improved resolution with respect to thermal steering in either of heating up and/or cooling down.

The various embodiments may be practiced in any combination thereof.

All cited patents and publications referred to in this application are incorporated by reference in their entirety.

The invention thus being described, it will be clear that it may be varied in many ways. Modifications and alterations will occur to others upon reading and understanding the preceding specification. It is intended that the invention be construed as including all such modifications and alterations insofar as they come within the scope of the appended claims or the equivalents thereof.

What is claimed is:

1. Cookware comprising:
   a substrate comprising a bottom surface of the cookware;
   an intermediate layer comprising a layer of graphite having a sulfur content of less than 350 ppm; and
   a cooking surface disposed above the intermediate layer,
   wherein the layer of graphite comprises at least one of a sheet of graphitized polymer, a sheet of compressed particles of exfoliated graphite, a mass of compressed particles of exfoliated graphite, or combinations thereof.

2. The cookware of claim 1 wherein the graphite has a density of at least 0.64 g/cm$^3$.

3. The cookware of claim 2 wherein the sulfur content comprises no more than 200 ppm.

4. The cookware of claim 2 further comprising insulation disposed between the substrate and the intermediate layer.

5. The cookware of claim 2 wherein an amount of the graphite in the layer comprises a sufficient amount to generate heat when exposed to a magnetic field of a frequency of at least 15 KHz.

6. The cookware of claim 1 wherein the substrate comprises an insufficient amount of ferromagnetic material to cook by induction.

7. The cookware of claim 1 wherein a surface area of the graphite layer comprises at least seven square inches.

8. The cookware of claim 1 wherein the substrate having a through plane thermal conductivity of less than about 75 W/m·K.

9. The cookware of claim 1 wherein the substrate comprises a structural architecture to support the graphite of the intermediate layer, the structural architecture devoid of an effective amount of a material to effectively couple for cooking applications when exposed to a magnetic field of at least 15 KHz.

10. The cookware of claim 1 wherein a Taber stiffness of the graphite comprises at least 30% more in a machine direction of the graphite layer as compared to a transverse direction of the graphite layer.

11. The cookware of claim 1 wherein a water pickup of the graphite layer comprises less than 30% by weight after a 2.5 hour soak in room temperature water at ambient pressure.

12. The cookware of claim 11 wherein a Taber stiffness of the graphite comprises at least 25% more in a machine direction of the graphite layer as compared to a transverse direction of the graphite layer.

13. The cookware of claim 1 further comprising wire mesh embedded within the layer of graphite.

14. A cookware article comprising:
 a substrate comprising a bottom surface of the cookware;
 an intermediate layer comprising a layer of graphite; and
 a cooking surface disposed above the intermediate layer,
  wherein the layer of graphite comprises at least one of a sheet of graphitized polymer, a sheet of compressed particles of exfoliated graphite, a mass of compressed particles of exfoliated graphite, or combinations thereof, and wherein the layer of graphite has a thickness of more than 7 microns and a water pickup of less than 30% by weight after a 2.5 hour soak in water at ambient conditions.

15. The cookware article of claim 14 wherein the graphite layer has a thickness of more than 7 microns and a Taber stiffness in a machine direction at least 25% higher than in a transverse direction.

16. An article comprising:
 a substrate comprising a bottom surface of the article;
 an intermediate layer comprising a layer of graphite having a sulfur content of less than 350 ppm; and
 a top surface disposed above the intermediate layer,
  wherein the layer of graphite comprises at least one of a sheet of graphitized polymer, a sheet of compressed particles of exfoliated graphite, a mass of compressed particles of exfoliated graphite, or combinations thereof.

17. The article of claim 16 wherein at least one of the substrate or the top surface has a thermal conductivity of less than 75 W/mK.

18. The article of claim 16 further comprising wire mesh embedded within the layer of graphite.

19. The article of claim 16 the graphite layer having at least one major planar surface, the graphite having a machine direction and a transverse direction, wherein a Taber stiffness of the graphite layer comprises at least 25% more in the machine direction as compared to the transverse direction.

20. The article of claim 16, the layer of graphite having a water pickup of less than 30% by weight after a 2.5 hour soak in water at ambient conditions.

* * * * *